Figure 1:
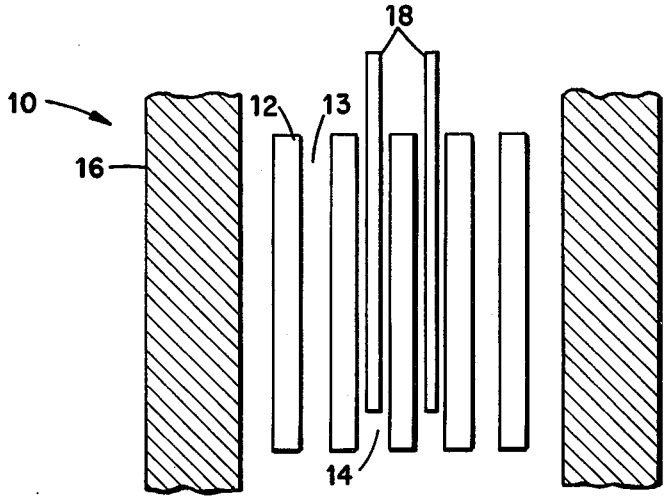
PRIOR ART Fig. 1
Figure 2:
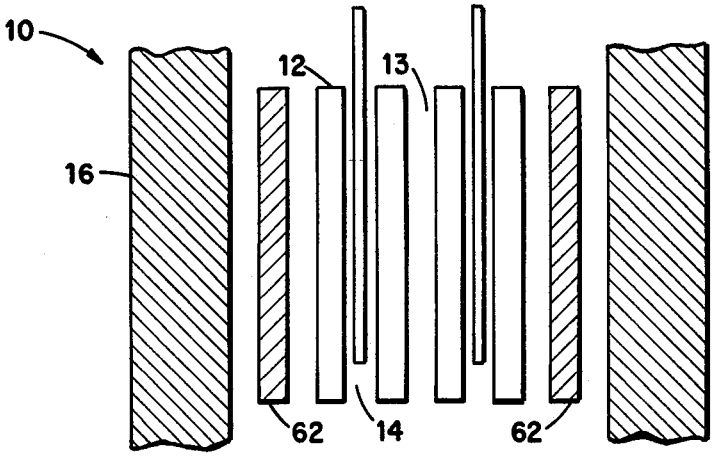
Figure 3:
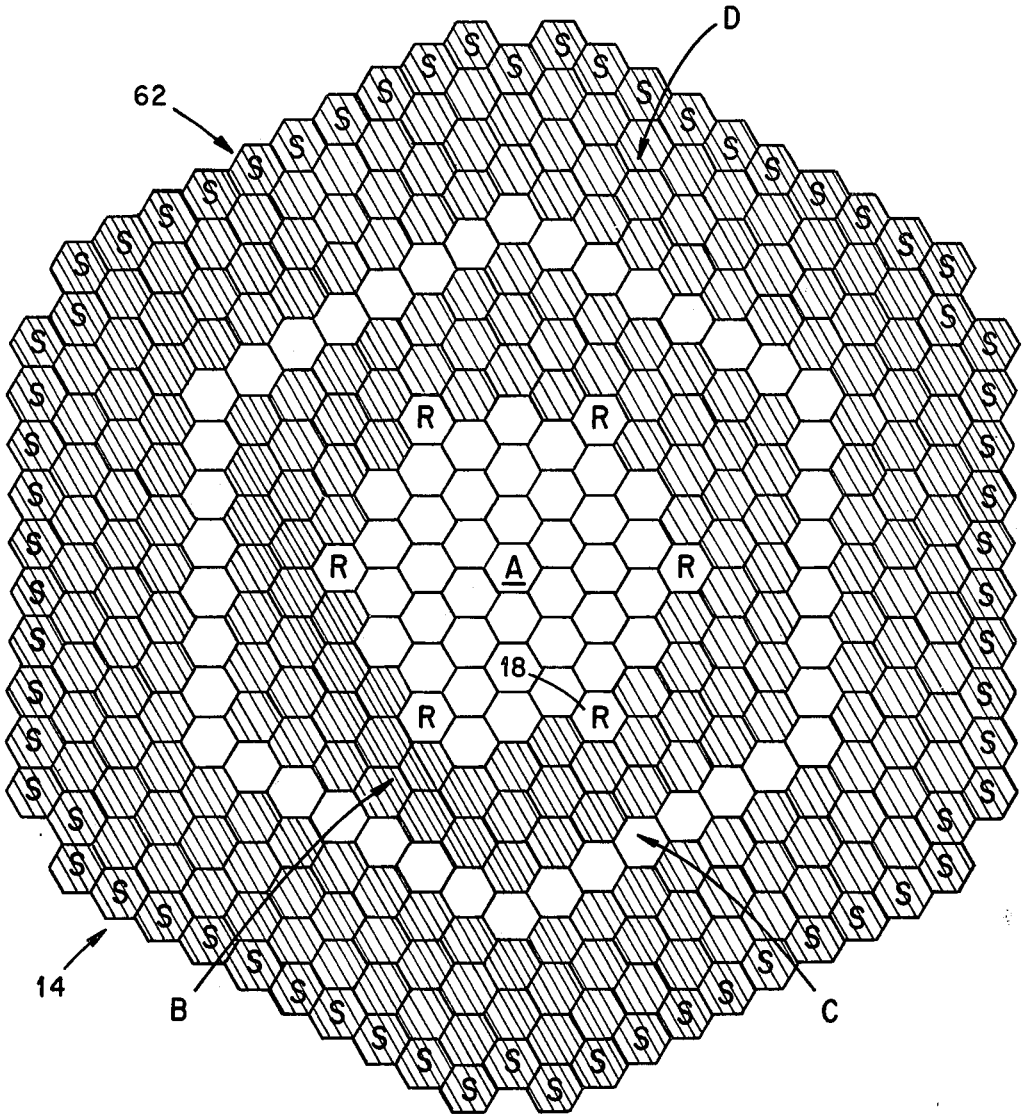
Figure 4:
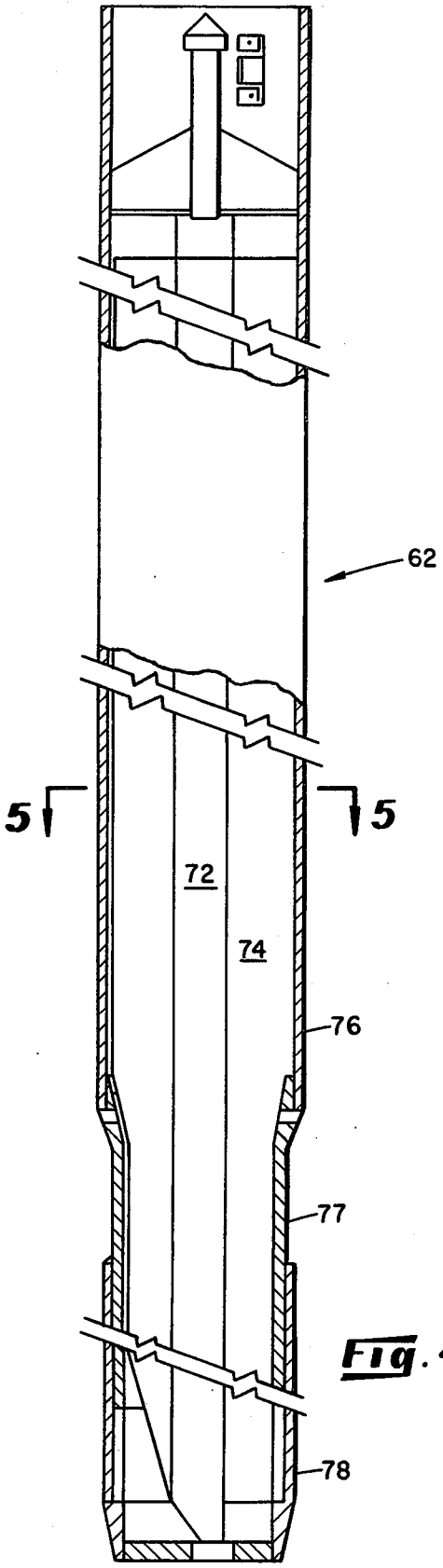
Figure 5:
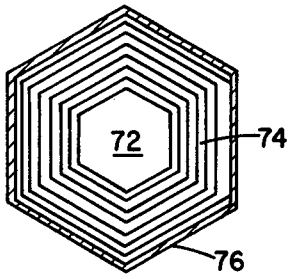
Figure 6:
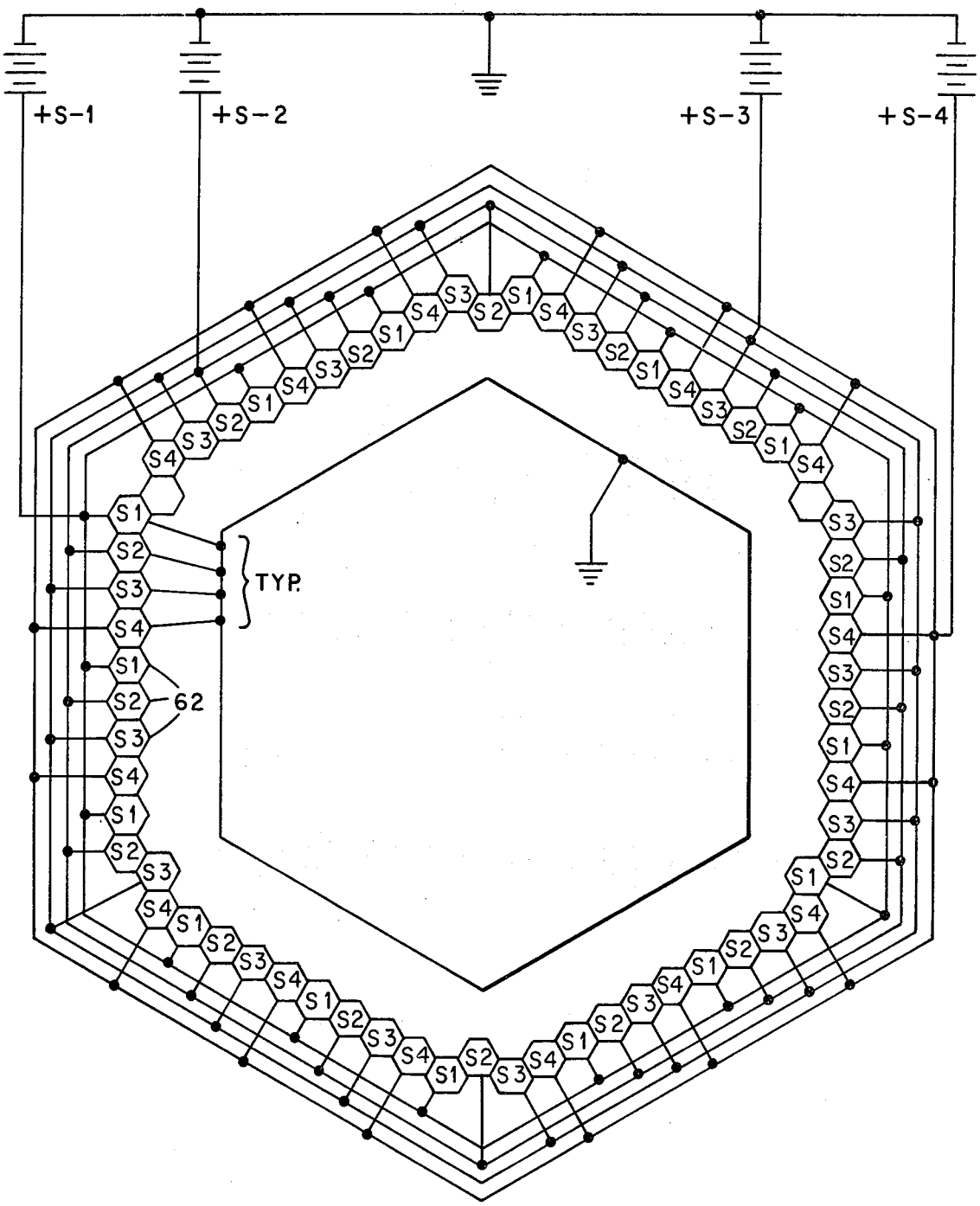
Figure 7:
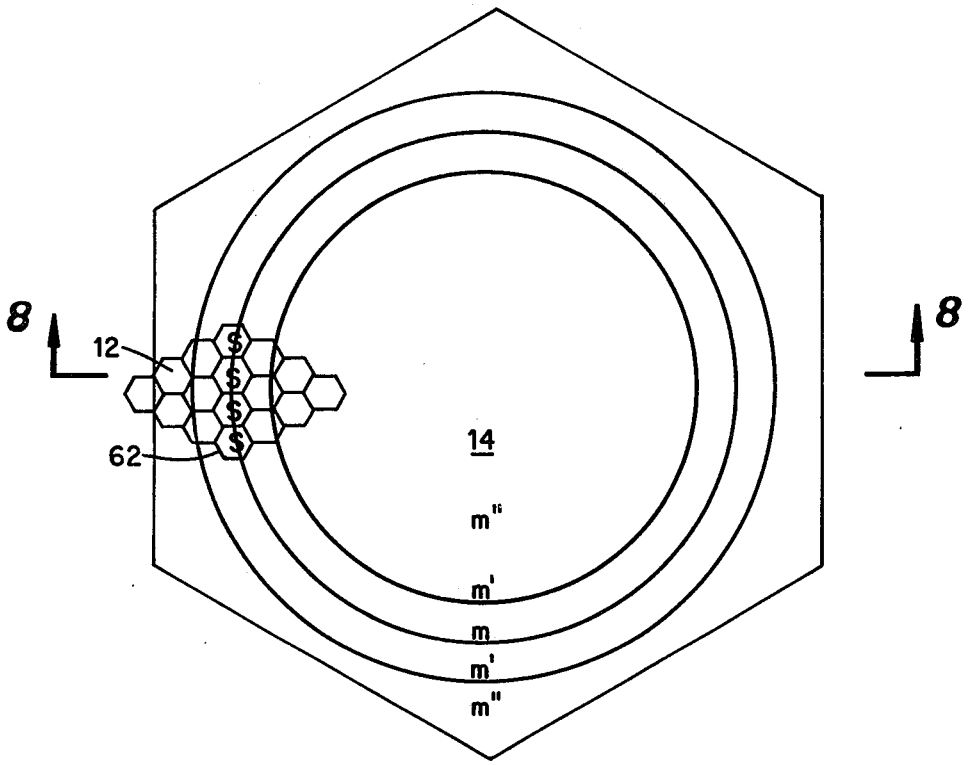
Figure 8:
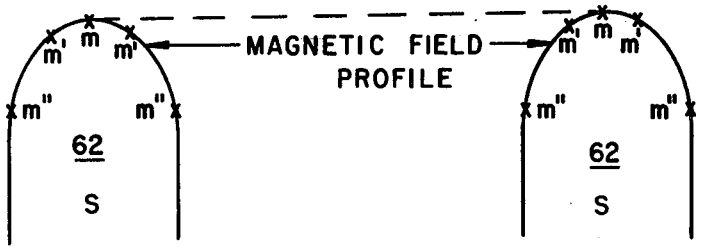
Figure 9:
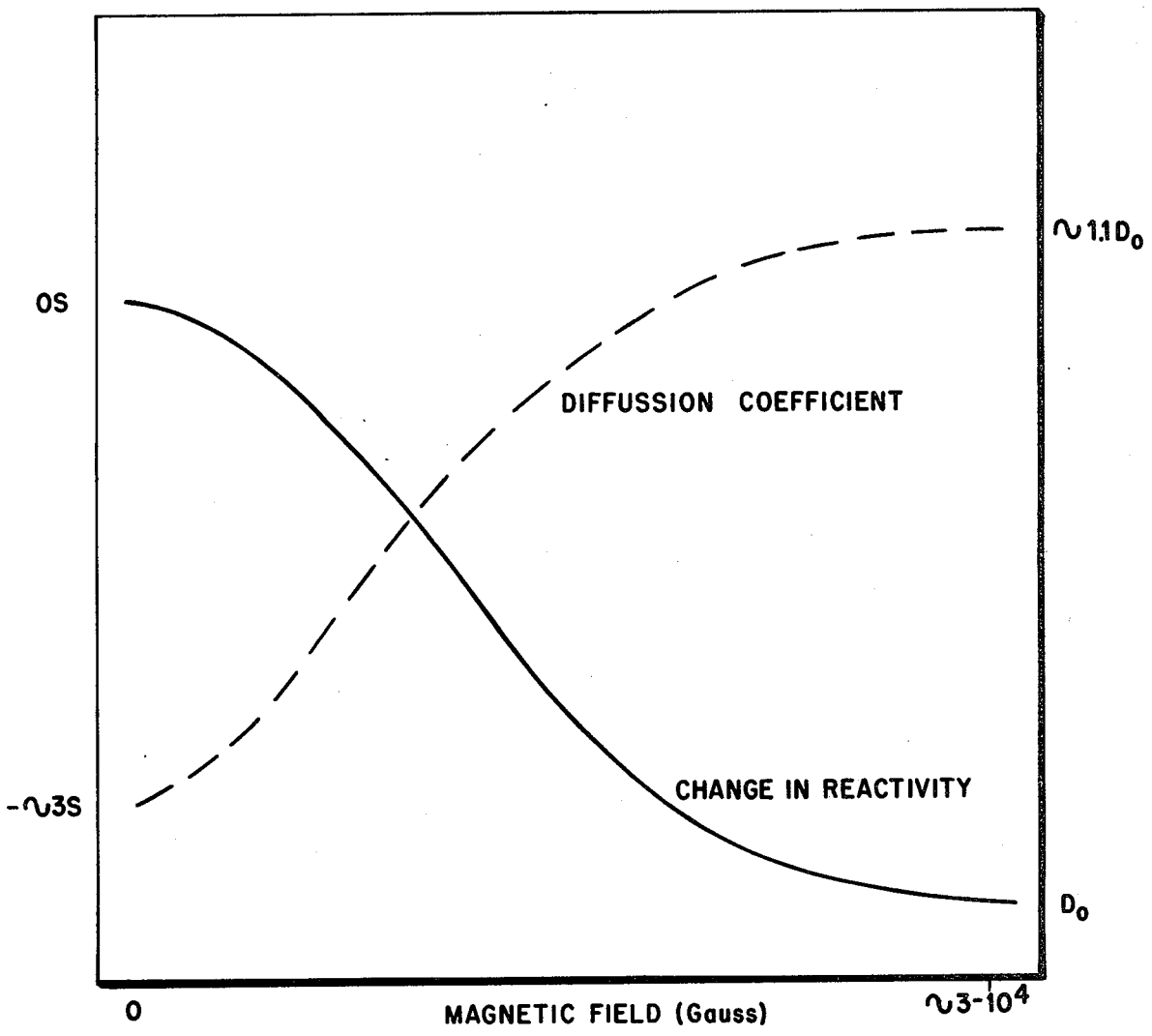

United States Defensive Publication [19] (H) [11] T954,003

Basdekas et al. [43] Jan. 4, 1977

[54] REACTIVITY CONTROL SYSTEM FOR NUCLEAR REACTORS BY MAGNETIC MEANS

[75] Inventors: Demetrios L. Basdekas, Rockville, Md.; George I. Bell, Los Alamos, N. Mex.

[73] Assignee: The United States of America as represented by the Atomic Energy Commission, Washington, D.C.

[21] Appl. No.: 676,438

[22] Filed: Apr. 13, 1976

Related U.S. Application Data

[63] Continuation of Ser. No. 439,791, Feb. 5, 1974, abandoned.

[51] Int. Cl.[2] ..... G21C 7/10

[52] U.S. Cl. ..... 176/86 R; 176/36 R

[57] ABSTRACT

A reactor control system comprising stationary control elements placed at the periphery of the reactor core is utilized to provide reactivity control of the reactor. The stationary control elements comprise electromagnets with a magnetic core surrounded by a plurality of windings which may readily be magnetized by electric current. The magnetic field generated therein has the effect of altering the neutron polarization in its vicinity, thereby changing the neutron diffusion coefficient and thus reflectivity of the magnetic control elements. The net effect is a change in the core reactivity proportional to the magnetic field strength. In addition to reactor control this system is intended to provide a protective function by reactor shutdown.

1 Claim, 6 Sheets Drawing, 13 Pages Specification

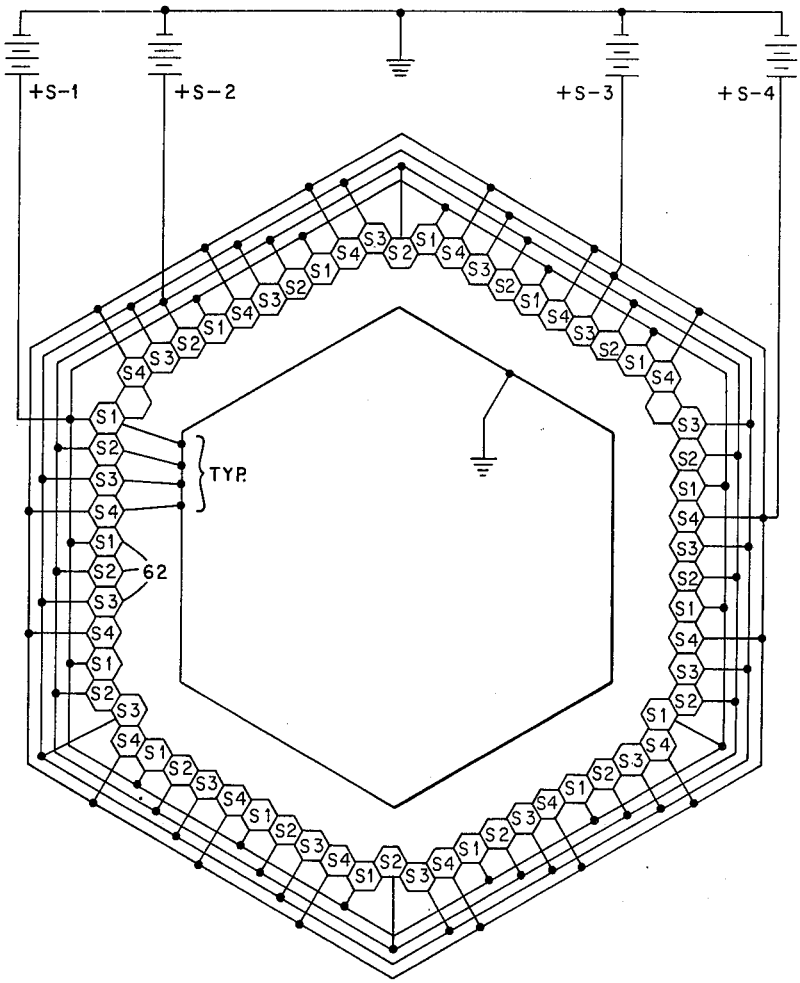

The file of this unexamined application may be inspected and copies thereof may be purchased (849 O.G. 1221, Apr. 9, 1968).